(No Model.) 7 Sheets—Sheet 1.
G. F. FISCHER.
SOLE CHANNELING AND ROUNDING OUT MACHINE.
No. 530,072. Patented Nov. 27, 1894.

Fig. 1.

WITNESSES:
John A. Kennie
C. Sedgwick

INVENTOR
G. F. Fischer
BY
Munn & Co.
ATTORNEYS.

(No Model.) 7 Sheets—Sheet 2.
G. F. FISCHER.
SOLE CHANNELING AND ROUNDING OUT MACHINE.
No. 530,072. Patented Nov. 27, 1894.

WITNESSES:
John A. Rennie
C. Sedgwick

INVENTOR
G. F. Fischer
BY
Munn & Co.
ATTORNEYS.

(No Model.) 7 Sheets—Sheet 3.

G. F. FISCHER.
SOLE CHANNELING AND ROUNDING OUT MACHINE.

No. 530,072. Patented Nov. 27, 1894.

WITNESSES:
John A. Rennie
G. Sedgwick

INVENTOR
G. F. Fischer
BY
Munn & Co
ATTORNEYS.

(No Model.) 7 Sheets—Sheet 4.

G. F. FISCHER.
SOLE CHANNELING AND ROUNDING OUT MACHINE.

No. 530,072. Patented Nov. 27, 1894.

(No Model.) 7 Sheets—Sheet 6.

G. F. FISCHER.
SOLE CHANNELING AND ROUNDING OUT MACHINE.

No. 530,072. Patented Nov. 27, 1894.

WITNESSES:
John A. Rennie
C. Sedgwick

INVENTOR
G. F. Fischer
BY
Munn & Co.
ATTORNEYS.

(No Model.) 7 Sheets—Sheet 7.

G. F. FISCHER.
SOLE CHANNELING AND ROUNDING OUT MACHINE.

No. 530,072. Patented Nov. 27, 1894.

WITNESSES:

INVENTOR
G. F. Fischer
BY
Munn & Co
ATTORNEYS.

UNITED STATES PATENT OFFICE.

GEORGE F. FISCHER, OF ROCHESTER, NEW YORK.

SOLE CHANNELING AND ROUNDING-OUT MACHINE.

SPECIFICATION forming part of Letters Patent No. 530,072, dated November 27, 1894.

Application filed October 4, 1893. Serial No. 487,160. (No model.)

*To all whom it may concern:*

Be it known that I, GEORGE F. FISCHER, of Rochester, in the county of Monroe and State of New York, have invented a new and Improved Sole Channeling and Rounding-Out Machine, of which the following is a full, clear, and exact description.

My invention relates to an improvement in sole channeling and rounding out machines, and it has for its object to provide a machine of simple, durable and economic construction, being so built that a number of pieces of sole leather may be placed upon a support in conjunction with a given pattern, and whereby when the machine is put in operation it may be left unattended, and will automatically act to round out sole after sole from the pile of material, channel and groove the soles and discharge them as completed, the operation continuing automatically until a complete sole has been formed from the last piece of material, whereupon the machine will automatically cut off the power and will remain idle until again charged.

Another object of the invention is to provide a sole channeling and rounding out machine in which the same machine at the same time, in addition to automatically rounding out, channeling and grooving out-soles will also round or cut out in-soles, the material from which the in-soles are to be cut being placed in piles, and whereby the machine will be so timed that when the last out-sole is completed the last in-sole will also have been shaped.

The invention consists in the novel construction and combination of the several parts, as will be hereinafter fully set forth and pointed out in the claims.

Reference is to be had to the accompanying drawings, forming a part of this specification, in which similar figures and letters of reference indicate corresponding parts in all the views.

Figure 1:
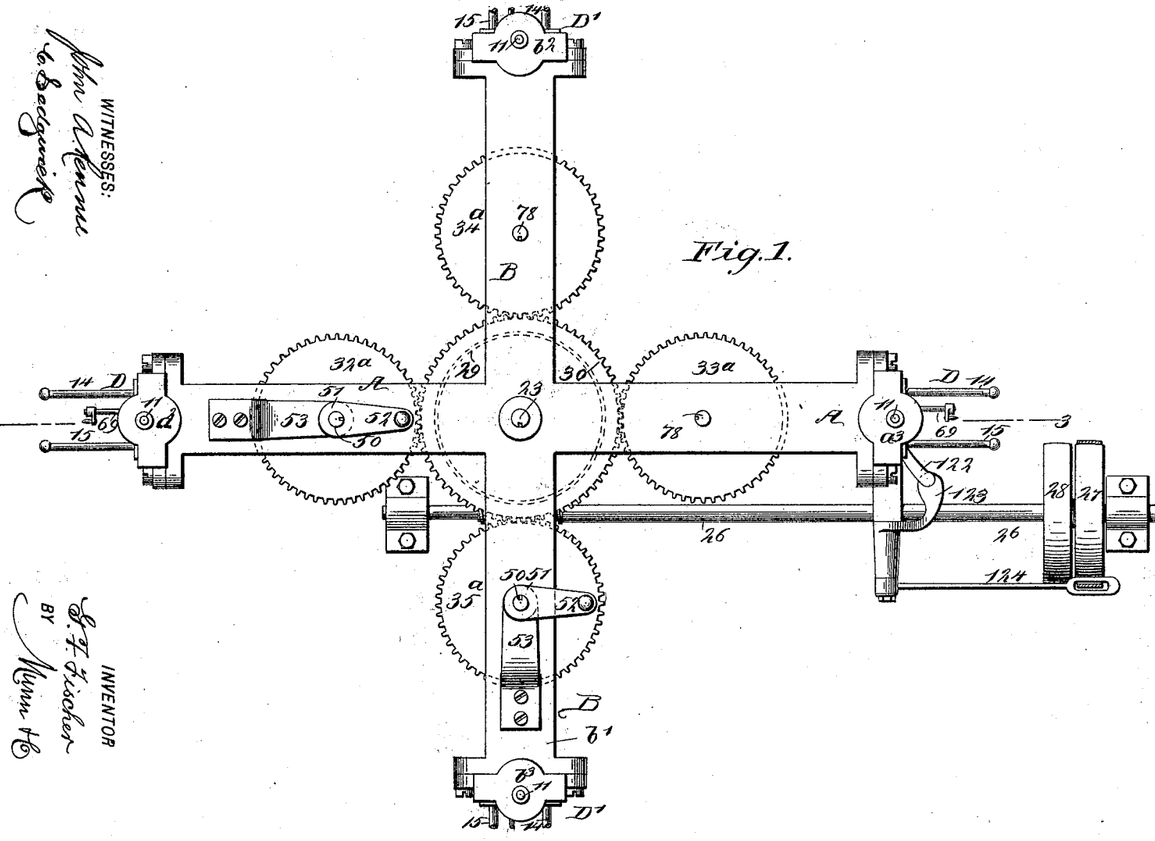
Figure 1 is a plan view of the machine.
Figure 2:
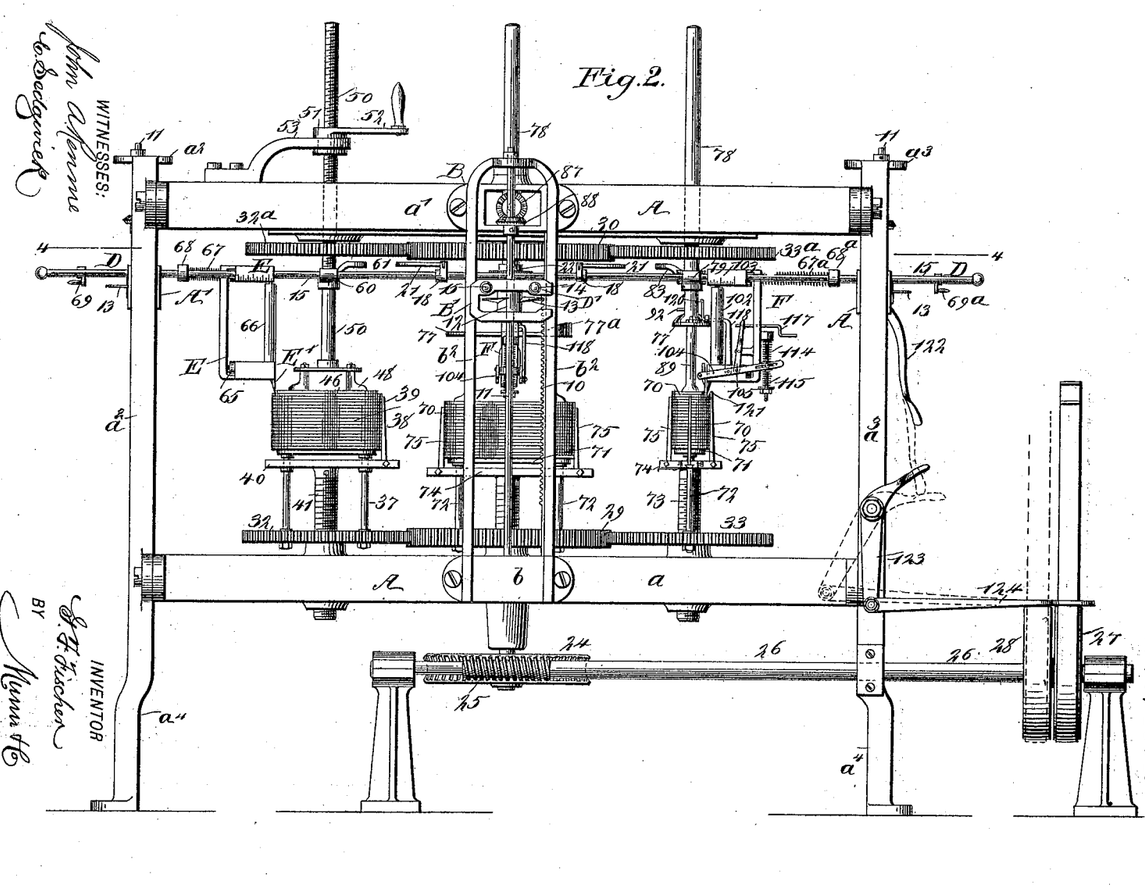
Fig. 2 is a side elevation thereof.
Figure 3:
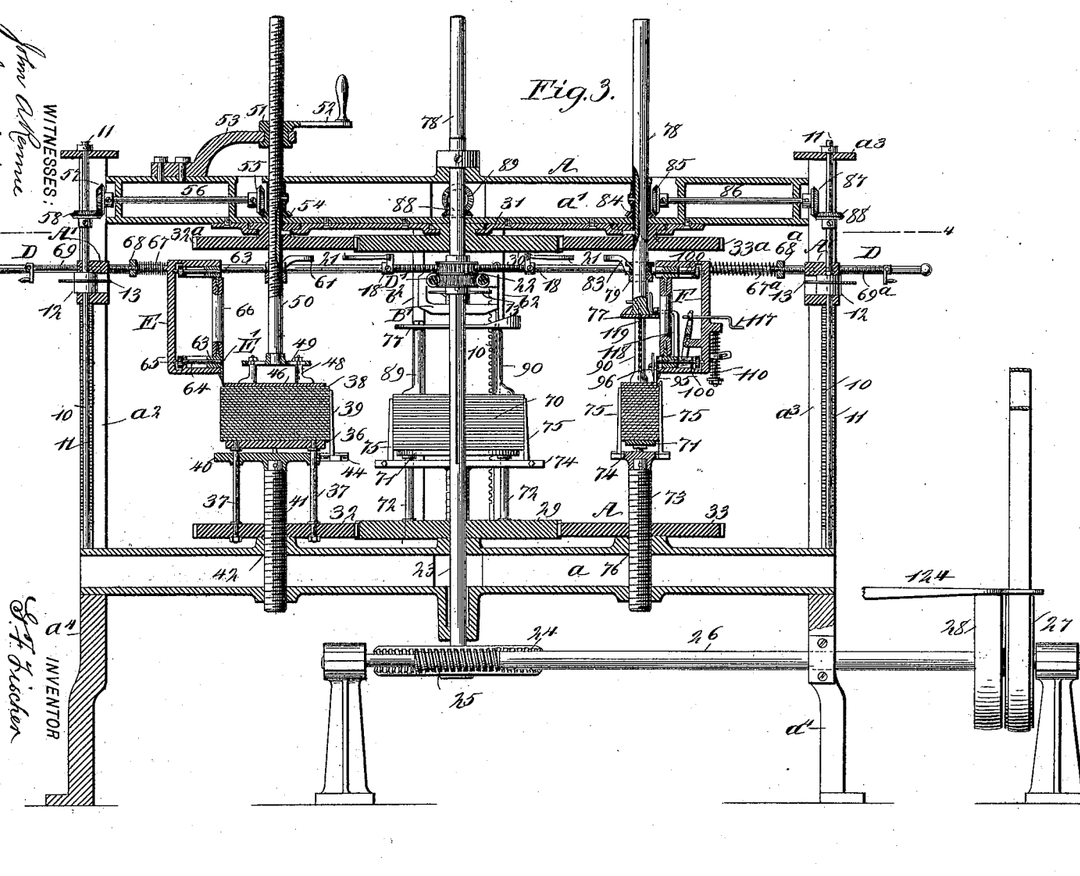
Fig. 3 is a longitudinal vertical section taken practically on the line 3—3 of Fig. 1.
Figures 8, 9:
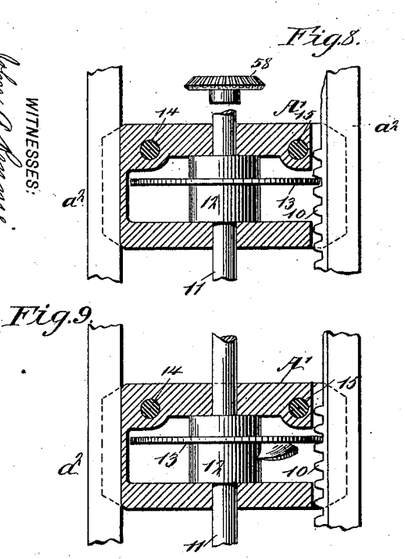
Figs. 8, 9, and 10, are sectional views through the traveling boxes of the feed mechanism, illustrating the feed wheel in said boxes and the racks in which the wheel has movement, the feed wheel being of spiral formation, as shown in the different positions in the several views.
Figure 10:
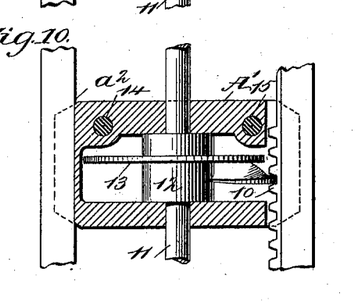

The frame of the machine is preferably made substantially cruciform shape, comprising practically two arms A and B, which unite at the center of the frame. In detail the arm A, consists of a base section $a$, a parallel upper section $a'$, and arched standards $a^2$ and $a^3$, respectively connecting the ends of the upper and lower sections, while legs $a^4$, support the base section at its ends. The arm B, is alike in detail, embodying a base section $b$, an upper section $b'$, arched standards $b^2$ and $b^3$ connecting the said sections, and legs supporting the base section. Preferably the upper and lower sections of each arm are of hollow or box-like formation, as shown in Fig. 3. Each arched standard is provided upon the inner face of one of its members with a vertical rack 10, which may extend from top to bottom, but ordinarily only from a point above the center of the standard to a point at or near its bottom, as shown in Fig. 3. Each standard $a^2$ and $a^3$ and $b^2$ and $b^3$, carries a sliding box, the boxes in the standard of the arm A being designated as A', and those on the standards of the arm B as B'. The boxes have guided movement upon the standards, and as shown in Figs. 8, 9, and 10, are open at their ends facing the racks 10 upon the standards. In the central portion of each frame standard a shaft 11, preferably of equal length is centrally and vertically journaled, as is shown in Figs. 2 and 3. These shafts are passed loosely through the boxes, and each shaft is splined or feathered, or otherwise treated to permit a hub 12 to slide upon it and turn with it. One of the hubs 12, is loosely mounted in each box A' and B', and as shown in Figs. 8, 9, and 10, each hub is provided with a spiral or screw blade or wing 13, made in two planes, the section of the lower plane abruptly or acutely meeting that of the upper plane, and the planes of each wing or blade 13 are practically one above the other at one point, as shown in Fig. 2. The spiral blades or wings are in engagement with the racks 10; therefore it is evident that when the shafts 11 operating the hubs 12 are turned in one direction the boxes will be forced to travel in direction of the base of the machine, and that as the engaging points of the blades change from one plane to the other the boxes will drop with a quick or sudden movement, as is shown in the progressive Figs. 8, 9, and 10. Such a movement is desirable since the feed of the knives of the machine is controlled by the racks and spiral blades, and it is necessary when a knife enters a sole to operate upon the same that it should immediately cut through from top to bottom, and at such time the decisive drop of the boxes takes place.

Figure 4:
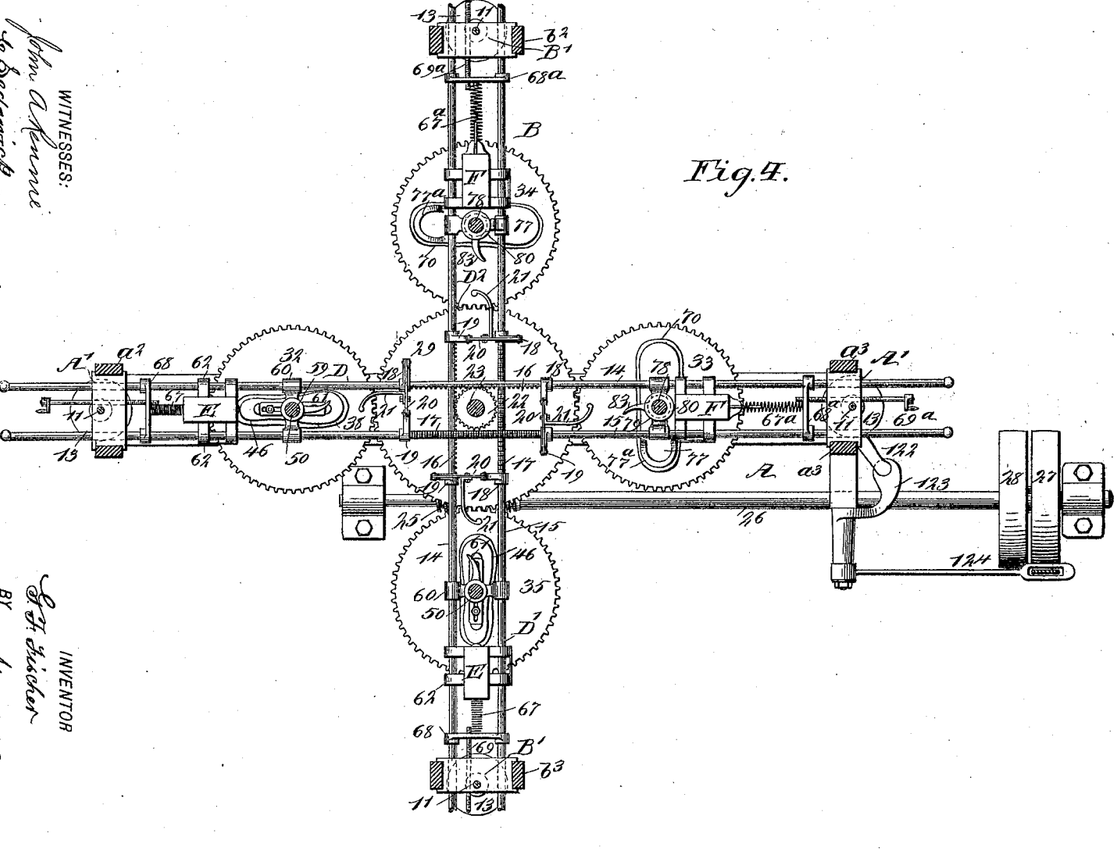
Fig. 4 is a horizontal section taken essentially on the lines 4—4 of Figs. 2 and 3.
Figure 11:
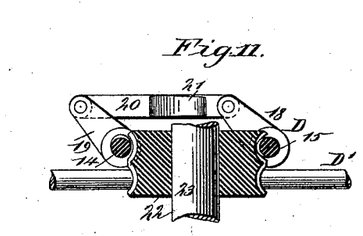
Figs. 11 and 12 are detail sections of the shifting devices for the carriages, the devices being shown in a different position in each view.
Figure 12:
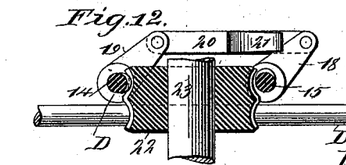
Figure 13:
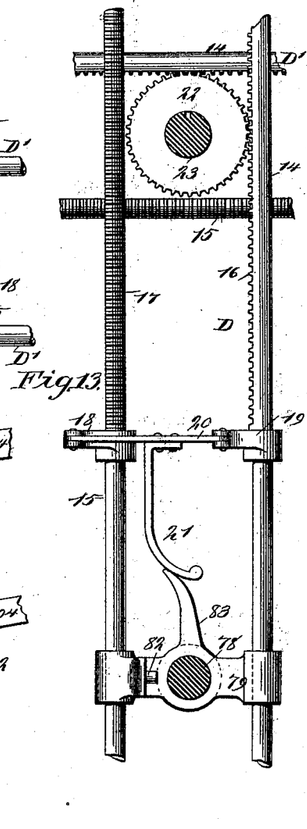
Fig. 13 is a detail plan view of a portion of one of the carriages and a plan view of the shifting mechanism, illustrating it in engagement with a shifting device.

The boxes of each arm A and B of the frame are adapted as supports for, and in fact constitute a portion of the carriages from which the knives employed are suspended. The carriages are designated respectively as D and D', and are shown in plan view in Fig. 4. The carriages are alike in construction, and each consists of two parallel rods 14 and 15, mounted to turn loosely and slide in the boxes A', for example; and each rod at its central portion is provided with a racked surface, designated respectively as 16 and 17, as is also shown in Fig. 4, and likewise in detail in Fig. 13. The racks are produced upon different faces of the rods, the racks 16 being upon a side of the rod 14 facing inward while the rack 17 on the rod 15 is on the upper portion of said rod and faces upward, and the two racked surfaces may be made to change position by imparting to the rods a quarter turn. The shifting is accomplished preferably through the medium of two crank arms 18 and 19, shown in Figs 4 and 13, and likewise in Figs. 11 and 12, the crank arms being secured one upon each rod, and angled or inclined in the same direction and connected by a link 20. Two of these shifting devices are employed upon each carriage, one being located at each side of the center of a carriage, as shown in Fig. 4, and each shifting device is provided with a trip arm 21 attached to its link near opposite ends. The trip arms project outwardly or in direction of the ends of the carriages, and are curved at their outward extremities transversely of the carriages and in opposite directions. The rods of the carriages are adapted to have end movement in both directions, the racked surface of one rod being intended to assist the movement in one direction, and the racked surface upon the opposite rod operating to move the carriage in an opposite direction; and in locating the carriages one is placed above the other so that one will not interfere with the other. The carriages are driven by two connecting gear wheels or a double faced gear 22, as shown in Figs. 11 and 12, a rack surface of one rod of each carriage being constantly in engagement with said gear. The gear 22, is mounted to slide upon and turn with a main drive shaft 23, journaled in the central portion of the frame, as shown best in Fig. 3. The lower end of the main driven shaft 23, is usually provided with a worm wheel 24, adapted for engagement with a worm 25, formed upon a drive shaft 26, suitably journaled beneath the frame, and the said drive shaft is provided with a fast pulley 27 and a loose pulley 28.

The main driven shaft 23 turns two large gears a bottom gear 29 and an upper gear 30, both gears being fast upon the shaft. The bottom gear rests upon a suitable hub or collar formed in the central portion of the upper surface of the base of the machine, while the upper gear 30, is mounted to turn in brackets or hangers 31, or equivalent devices, formed upon the central portion of the lower face of the upper section of the frame.

The lower gear wheel 29 of the main driven shaft is made to mesh with two lower gears 32 and 33, located one at each side of it at the lower frame section of the arm A; and the said lower driving gear 29 meshes in like manner with two gears 34 and 35, located one at each side of it in the lower or base portion of the arm B of the frame; and similar gears $32^a$, $33^a$, $34^a$ and $35^a$, are driven by the upper driving gear 30, the upper gears being located over their corresponding lower ones.

Each arm A and B of the machine, is adapted to carry a mechanism for rounding out insoles, and a mechanism for rounding out, channeling and grooving out-soles. The mechanism for rounding out in-soles and the manner in which it is operated will be first described. Such mechanism is located between the gears 32 and 32ª of the arm A, and the gears 35 and 35ª of the arm B, and since the mechanism is alike in both arms of the machine it will be described in connection with the arm A.

Figures 5, 6, 7, 18:
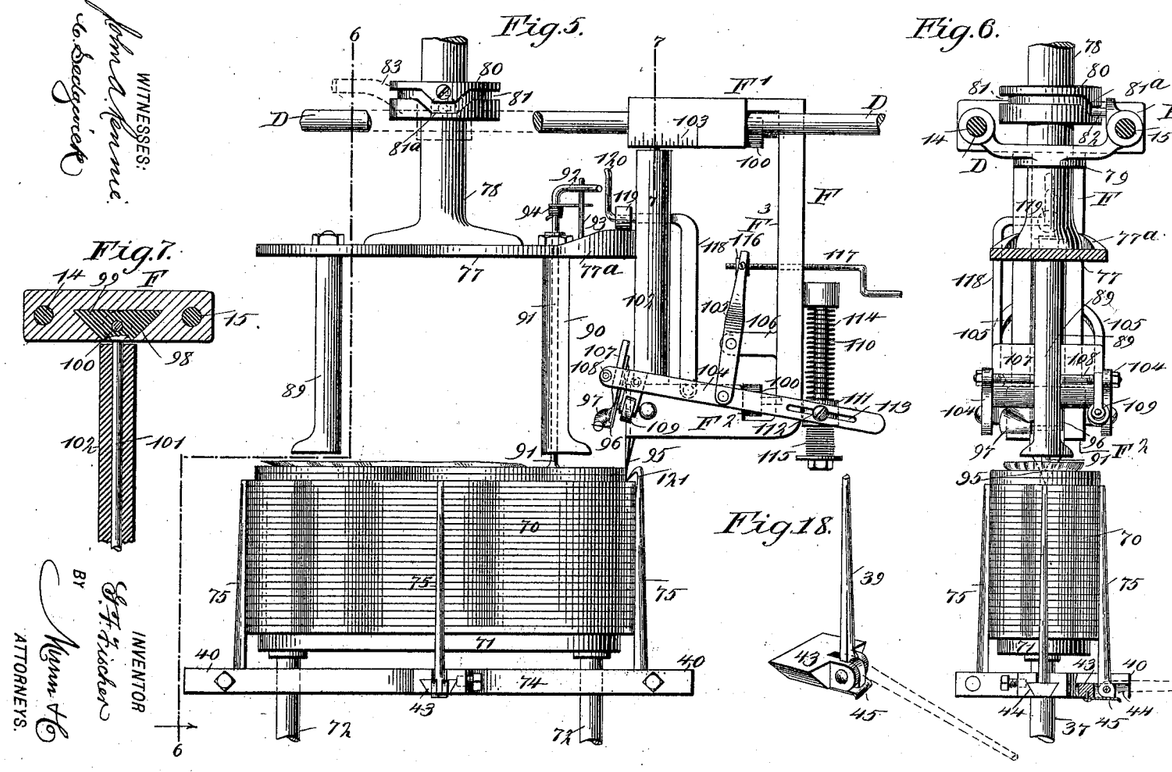
Fig. 5 is a detail side elevation of the table adapted to carry material to be operated upon, the pattern for the out-sole, the grooving, channeling and rounding out knives and the frame carrying the same.
Fig. 6 is a section taken practically on the line 6—6 of Fig. 5.
Fig. 7 is a detail sectional view on the line 7—7 of Fig. 5.
Fig. 18 is a detail perspective view of one of the guide fingers employed in connection with each pile of material to be operated upon.

The material 38 from which the in-soles are to be cut is placed in sheets one upon the other upon a table 36, the table being connected with and supported upon the gear 32 through the medium of pillars 37. The mass of material 38 is held in proper alignment through the medium of guide fingers 39, which engage with the outer surface of the pile at various points, and the said fingers are carried by a table 40, located beneath the table 36 and independent thereof. The table 40, is provided with apertures through which the pillars 37 pass, and the table 40, is adapted to have vertical movement and is guided by the pillars. The vertical movement is imparted to the lower table 40 through the medium of a screw shaft 41, secured to the under surface of the table, the said screw shaft being revolved by frictional engagement with the gear 32 through which it passes; and the screw shaft is further made to pass through apertures 42, made in the base section of the frame, the walls whereof are threaded. Thus, while the table 36 carrying the material to be cut always stands at the same elevation from the gear 32 and turns with the gear, the table 40 while turning with the gear, and the table 36, will at the same time be gradually carried downward in direction of the gear 32 as the table revolves, and the guide fingers 39, will travel downward with the table 40 in a manner to remove their upper ends from the path of the knife performing the cutting. One of the fingers 39, is shown in detail in Fig. 18, and the said fingers are preferably pivotally connected with a substantially dove-tail shape block 43, which block is adapted to slide in dove-tail ways 44, produced in extensions from the table 40. The fingers 39, are held in an upright position through the medium of springs 45, attached to the blocks 43, having a bearing against the lower pivotal ends of the fingers, which ends are enlarged, as shown in Fig. 18. Thus any one or more of the fingers may be drawn downward below the table 36, in order that the material may be piled up upon said table, or the finished in-soles be readily removed therefrom.

The pattern 46 of the in-sole is connected by standards 48, or their equivalents with a follower 49, the said follower being fast upon the lower end of a screw shaft 50; and the said screw shaft has a splined connection with the upper driving gear 32ª, as shown in Fig. 3, being turned by the gear, yet capable of moving vertically through it; and the upper portion of the screw shaft extends above the upper frame section $a'$, and is made to enter a correspondingly threaded nut 51, provided with a crank arm 52, the said nut being held to turn loosely upon a bracket 53, secured upon the upper portion of the frame.

The hub of a beveled gear 54, is splined upon the screw shaft between the upper and lower members of the upper frame section $a'$, and the said beveled gear 54, is in mesh with a similar gear 55, fast upon a shaft 56 journaled in the upper frame section; and the shaft 56, carries at its opposite end a beveled gear 57, which meshes with a like gear 58, located upon the feed shaft 11 placed in the frame standard $a^2$. The shaft 50, below the gear 32ª is held to turn loosely in a cross head 59, provided with side lugs 60, through which the bars 14 and 15 of the carriage D freely pass and are free to turn; and the cross head is provided with a finger 61, which extends in direction of the trip arm 21 of the left-hand trip mechanism of the upper carriage D, as is shown in both Figs. 3 and 4.

It may be here remarked that the angle of inclination of the crank arms 18 and 19 of the left-hand shifting mechanism of each carriage is the reverse of the inclination of the corresponding arms of the opposing shifting mechanism; and when the finger 61, engages with the trip arm 21 of the said left-hand shifting mechanism, the rods of the carriage D, will be rocked in a manner to throw the rack 17 in engagement with the driving gear 22, and the rack 16, will be carried out of engagement with said gear, thus causing the carriage to travel in a reverse direction.

The cutting frame E, adapted to carry the knife E' for cutting the in-soles, is provided with ears 62 upon opposite sides, as shown in Fig. 4; and the rods of the carriage D will loosely pass through said ears. The frame proper E, comprises an upper and a lower horizontal member, and an outer vertical member connecting the two, as best shown in Fig. 3. Boxes 63, are held to slide in the upper and lower members of the frame, being manipulated through the medium of adjusting screws 64, usually provided with suitable heads 65, and in the inner ends of the boxes the axle of a vertical roller 66, is journaled, and the knife E', is located in the lower end of the frame, being clamped therein, secured thereto, or held in vertical position in any suitable or approved manner.

The knife is held in engagement with the pattern, or against the material to be cut, by means of a spring 67, connected with the upper outer portion of the frame E, and with a cross head 68, held to slide upon the carriage, the cross head being adjusted horizontally to increase or to decrease the tension upon the spring 66 through the medium of an adjusting screw shaft 69, which is connected with the cross head, and is held to turn in the box A' of the frame standard $a^2$, as is shown in both Figs. 3 and 4.

The roller 66, is rendered adjustable in order that when it is made to bear against a pattern and is adjusted outward beyond the knife, the knife will cut a blank corresponding in shape to the pattern, or larger, and wherein when the roller is adjusted so that the knife will be in advance of its bearing face, when the roller is brought to bear against the pattern the knife will cut a blank corresponding to the pattern of a smaller size. Thus in the operation of the sole-cutting mechanism, after the screw shaft 50 has been forced downward to clamp the material to be cut between the pattern and the table 36, and the guide fingers 39, are in position, the table 36, will be revolved by the movement of the gear 32, and the carriage, through the medium of its shifting mechanism and gear connection with the driving shaft 23, will move alternately in direction of the right and of the left, for example, this movement being rendered necessary, since when the knife, or the roller 66, is in engagement with the toe or heel portion of the pattern, the knife-carrying frame must be carried much farther to the right or to the left, as the case may be, than when the knife, or roller, is in engagement with the side portions of the pattern. In fact, the movement of the carriage is such as to cause the knife to bear with equal tension upon the entire edge of the pattern as the latter is revolved. The knife will continue to cut sheet after sheet of material until all of the sheets have been cut to proper shape, since after one in-sole has been shaped the feed mechanism heretofore described will act to drop the carriage a sufficient distance to cause the knife to penetrate the next sheet of material from which the next in-sole is to be made.

Figure 16:
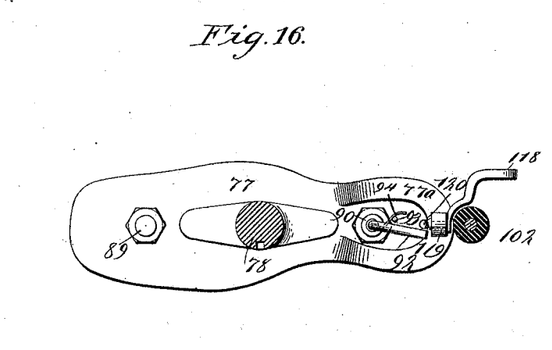
Figs. 16 and 17 are plan views of the pattern, illustrating it in different positions with relation to the sole to be shaped therefrom, Fig. 17 illustrating the completed sole as being ejected from the pile of material from which the soles are to be shaped.
Figure 17:
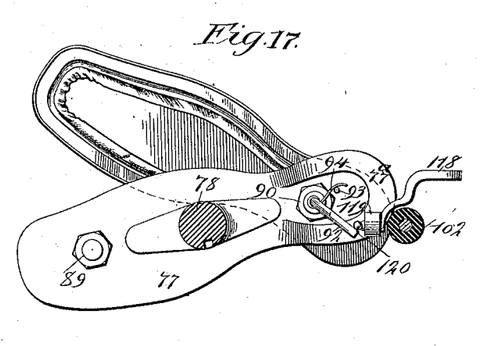

The mechanism adapted for rounding out, grooving and channeling out-soles is contained between the gears 33 and 33ª of the arm A, and the gears 34 and 34ª of the arm B. This mechanism will also be described in connection with the arm A. The material 70, from which the out-soles are to be cut, is placed upon a table 71, connected with the gear 33 by means of pillars 72; and a screw shaft 73, is made to support a second table 74 carrying fingers 75, corresponding in shape and construction to the fingers 39 heretofore described, the fingers 75, being adapted to keep the strips of material in proper alignment. The table 74 carrying the fingers has guided movement upon the pillars 72, and the screw shaft 73, is rotated from the gear 33, the shaft being held to turn in threaded openings 76, produced in the base, whereby as the shaft 73, is revolved in one direction it will be made to travel in direction of the base. The pattern 77, used in connection with the shaping of the out-soles, is held at an elevation above the sheets of material on the table 71, as shown best in Fig. 5. The pattern is shaped, as shown in Figs. 16 and 17, with an embossed or cam surface 77ª at its heel portion, the cam surface commencing at the points in the pattern corresponding to the points where the channeling and grooving terminate in the out-sole, that is, at the commencement of the heel. The pattern 77, is firmly secured at its center to the lower end of a shaft 78, and this shaft passes upward through a cross head 79, mounted loosely upon the bars of the upper carriage D, the cross head being shown in detail in Figs. 6 and 13. The shaft passes up through the central portion of the cross-head, and immediately above said head is provided with a collar 80, rigidly attached thereto, and the said collar is provided with an annular groove 81 in its outer face, which groove is depressed at one point, the said depressed portion being designated as 81ª, and is shown both in Figs. 5 and 6. A pin 82, which is secured upon one side of the cross head, is located within the groove 81 at all times, and virtually connects the shaft with the carriage, causing the shaft to rise and fall with the carriage, while at the same time the shaft is free to turn in the bearings by which it is connected with the carriage. The cross head 79, is provided with a trip finger 83, corresponding to the trip finger 61 described in connection with the cross head 59 of the screw shaft belonging to the in-sole cutting mechanism; and the trip finger 83, is adapted for engagement with the trip arm 21 of the left-hand shifting mechanism of the carriage D, and serves by said trip mechanism to throw into engagement the rack 17 with the pinion 22 and carry the rack 16 out of engagement with said pinion.

The shaft 78, has splined connection with the upper gear 33ª by means of which it is driven, and yet has sliding movement through it; and a beveled gear 84, is likewise splined upon the shaft 78 between the upper and lower members of the upper frame section $a'$, the beveled gear 84, meshing with a like gear 85 upon a line shaft 86, which carries at its outer end a beveled gear 87, meshing with a like gear 88 located upon the feed shaft in the right-hand standard $a^3$. It will thus be observed that the shaft 78 is supported by the carriage.

The pattern 77, is provided with what may be termed two presser feet 89 and 90, projecting from the under side of the pattern, one at each side of its center; and the said presser feet are adapted for engagement with the uppermost blank or sheet of material upon the pile from which the out-soles are to be rounded out. The innermost presser foot 90 is hollow, and a shaft 91 is passed loosely through it and through the top portion of the pattern adjacent to the heel, or the cam surface 77ª. The lower end of the shaft 91, is shaped as a pointer as it is intended that it shall penetrate the uppermost blank or sheet 70; and the upper end of the shaft 91 is formed with a spring-controlled crank arm 92, the crank arm being limited in movement in one direction by a post 93, against which a spring 94, which is coiled around the shaft has bearing at one end. The shaft 91, is adapted to throw off the uppermost out-sole when it has been completed, in a manner to be hereinafter described; and it may here be remarked, that at the complete formation of each out-sole the presser feet 89 and 90, are raised from engagement with the completed or outer out-sole, and carried to the position shown in Fig. 5, and this is accomplished by the pin 82 in the cross head 79 entering the depression 81ª in the cam groove 81 formed in the collar 80 attached to the shaft 78, and by this means the shaft will be raised and will carry with it the pattern and parts attached, and when the pin enters the upper portion of the cam groove the presser feet will again descend to an engagement with the uppermost out-sole and remain in such engagement, until the treatment of the sole is completed and it is to be discharged.

In the treatment of an out-sole three knives are employed, a rounding out knife 95, a channeling knife 96 and a grooving knife 97. These knives are all carried by a frame F, which frame consists of a top section F', through which the bars of the carriage D loosely pass, a bottom section F² and a vertical rear section F³, connecting the top and bottom sections. The top and bottom section at what may be termed their inner ends, are centrally provided with a dove-tail shaped slide-way 98, as shown in detail in Fig. 7, and each of these slide-ways is adapted to carry a correspondingly shaped block 99, likewise shown in Fig. 7, and these blocks are adjustable toward or away from the pattern, or inner edges of the top and bottom sections by means of adjusting screws 100. The blocks 99, are adapted to receive the ends of a spindle 101, upon which spindle a vertical roller 102 is held to turn; and the upper section F' of the knife frame F, is provided with a scale 103, adapted to indicate the sizes of soles. The roller 102, is adapted to bear against the outer edge of the pattern 77, and the knives are located at the forward or inner end portion of the lower frame section F²; therefore, if the roller is adjusted inwardly, or in direction of the pattern, and practically in advance of the knives, the knives will produce an out-sole of larger size than the pattern in proportion to the distance the roller is advanced to or over the knives, and the sole may be made smaller than the large pattern by adjusting the roller within the frame, or in an opposite direction.

Figure 19:
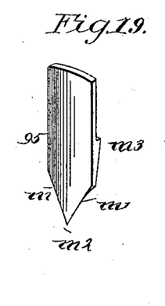
Figs. 19 and 20, are detail perspective views of the obverse and reverse sides of the rounding out knife.
Figure 20:
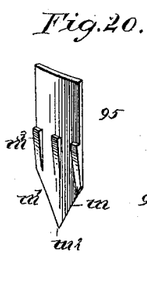

The knife 95, adapted for rounding out is permanently in the front end of the lower knife frame section F², and the said knife has a double cutting edge $m$ and $m'$, as shown in Figs. 19 and 20, and a diamond point $m^2$. The object of providing the knife with two cutting edges is to enable it to cut backward or forward as desired, and the diamond point enables the knife to easily and quickly penetrate the sole. A further feature of this knife consists in the fact that the side facing of the material to be cut is concaved or hollowed out, so that it will produce curves truly and provide a smooth and even edge upon the sole. The back of the knife is provided with ribs $m^3$, so that it will produce a suitable space between the sole and the refuse matter, or part cut away, thereby preventing friction and wear upon the knife. These ribs $m^3$ also serve as stops, which prevent the upward movement of the knife and thereby assist in holding the knife firmly in position.

Figure 14:
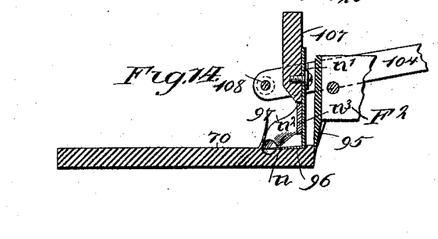
Fig. 14 is a detail sectional view through a sole being rounded out, grooved and channeled, illustrating the knives for performing the said functions in vertical section.
Figure 15:
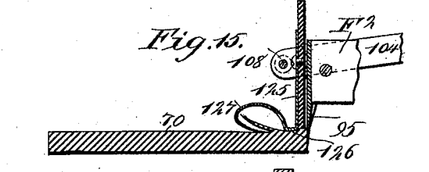
Fig. 15 is a view similar to Fig. 14, illustrating a modification in the shape of the grooving and channeling knife.
Figure 21:
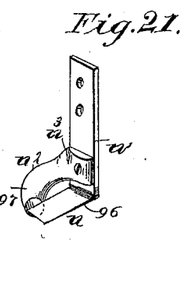
Fig. 21 is a detail perspective view of the channeling and grooving knife employed upon McKay soles.

Two kinds of channeling and grooving knives are used in connection with the machine, one of them embracing the cutting members 96 and 97 and shown in Figs. 14 and 21, being adapted for use exclusively for what is usually termed McKay soles, used in connection with the so-called McKay shoes, while the form of knife shown in Fig. 15, is especially adapted for use in producing what is known as "turn" soles. In the knife for making McKay soles, the channeling knife 96, is practically in one piece with the grooving knife 97; that is to say, the groover is formed integrally with the channeler, and these cutting instruments operate only upon the grain side of the sole. The McKay channeling knife comprises as is shown in Figs. 5, 14 and 21, a horizontal blade $n$, sharpened upon its sides, and a shank $n'$ standing vertically and at right angles to the blade. The shank of the blade is usually attached to a plate 107, located one at each side of the lower section F² of the knife-carrying frame F, the knife being in front of the said section F² and located about centrally between the arms. The said arms 104, are fulcrumed at or near their centers upon the members of a yoke 105, which yoke is pivoted upon a stud 106, projected from the vertical member F³ of the knife carrying frame, as is shown in Fig. 5. The clamping of the channeling knife is effected preferably through the medium of a rod 108, shown in Fig. 6, which is passed through the forward extremities of the arms 104, and is provided with nuts at its extremities. The grooving knife 97, comprises a hollow cylindrical body $n^2$ and a slotted shank $n^3$, the shank being made integral with the body of the channeling knife as shown in Fig. 21; and the body $n^2$ of the grooving knife is curved from the channeling knife shank to a point opposite one side of the channeling blade. A roller 109, is attached either to the rod 108 or to the opposite side arm 104 at its forward end, said roller being adapted to travel upon the upper surface of the leather in advance of the channeling and grooving knives. The knife employed for channeling and grooving "turn" soles is made in one piece, as illustrated in Fig. 15. The knife consists of the vertical member or shank 125, attached to the knife-carrying frame F in substantially the same manner as the shank of the McKay knife, a horizontal member 126, and a loop or curved member 127. The outer edge of the horizontal member 126 grooves or "leafs" the sole on its flesh side, while the portion of the loop member at or near its confluence with the horizontal member and with the assistance of the latter member, enables the knife to render the edge of the sole thinner than the remaining portion, so that the bottom of the channel in the turn sole will be in alignment, or nearly so, with the upper plane of the thinner edge of the sole. This formation is necessary since the needle which is used when the sole is being sewed on, passes in and under the leaf of the groove, and comes out at the shoulder on the upper edge of the sole. Thus it will be seen that one end of the loop member 127 channels the sole, while the other portion of the loop and the horizontal member 126, grooves or makes the edge of the sole thinner than the remainder, and the shank is employed only for securing the knife during the cutting operation.

The arms 104 are spring controlled in order that the knives will not be affected by irregularities in the leather; and the tension device applied to the knife-carrying arms 104, is preferably constructed as shown in Fig. 5, in which a rod or stud 110, is located at the outer or back surface of the knife-carrying frame, and a sleeve 111 is held to slide upon the rod, being connected with the rear extremities of the arms 104 by means of pins or screws 112, passed through slots 113, contained in the knife-carrying arms, the pins or screws being secured to the sleeve. A spring 114, is coiled around the rod above the sleeve, and a second spring 115, is coiled around the rod below the sleeve. When the springs are equal in tension the rounding out and grooving knives are held properly upon the material to be cut. When an obstruction is met the knives may travel upward with the arms 104 against the tension of the springs, the springs serving to restore the knives to their normal position when the obstruction is passed. The grooving and channeling knives may be adjusted laterally by means of the yoke 105, as the said yoke carries at its upper end an interiorly threaded nut 116, through which a threaded adjusting shaft 117 is passed, journaled in the knife-carrying frame and operated by a crank or like device.

As heretofore stated, the channeling and grooving of the outsole is made to terminate at the instep or commencement of the heel, and when this part of the sole is reached the channeling and grooving knives should be elevated. This is automatically accomplished through the medium of a lift arm 118, the said arm being attached to the knife-carrying arms 104, as shown in Figs. 5 and 6; and the uppes end of the arm is so curved that it extendr beyond one side of the shifting guide roller 102; and the forward upper end of the lifting arm is provided with a friction roller 119, adapted to travel upon the upper surface of the pattern; and when the roller reaches the cam surface 77ª of the pattern, as it travels up said surface it lifts the grooving and channeling knives from the sole being operated upon, but the rounding-out knife still continues to perform its work, and at the time the rounding-out knife has finished its work upon the outsole, the arm 92 of the presser foot shaft 91, will be brought in engagement with the crank arm 120, constituting a continuation of the lifting arm 118, and at the same time the pin 82 in the pattern shaft cross head will reach the depression 81ª in the cam groove of said shaft, and will lift the shaft and clear the presser feet from the upper sole. The presser foot shaft 91, will continue to engage with the said upper sole; and as the crank arm 92 of the shaft 91 meets the crank arm 120 of the lifting arm 118, the presser foot shaft 91 will be turned to the position shown in Fig. 17, and the upper sole will be whipped off, or thrown or discharged completed from the upper portion of the pile of material being operated upon.

As the material being acted upon is generally larger than the pattern or the outsole to be cut, when the rounding-out knife has completed its work there will be left a loose border around the sole. In order that this border may be severed and dropped from the pile one of the guide arms 75 is provided with a knife 121 upon its upper end, which will engage with the upper surface of the material to be cut; and as the table with which that finger is connected travels downward the knife will be drawn through the leather and thus provide for a severance of the said band or border, enabling it to drop clear of the sole.

An arm 122 is attached to one of the boxes, the box A, for example, which when the carriage with which the box is connected has descended a predetermined distance or sufficiently far to have insured the last piece of material being operated upon, said arm will strike or engage with a lever 123, fulcrumed upon the frame of the machine, which lever is connected with a belt shifter 124, and the arm, upon pressing the lever 123, will cause the belt shifter to carry the belt from the fast driving pulley to the loose driving pulley on the driving shaft, and thus stop the machine. The same tension device is applied to the knife carriers or holders F, as has been described in connection with the knife holders or carriers E, the said tension device connected with the knife-carrier F consisting of a cross head 68ª, held to slide upon the carriage with which the carrier is connected, a spring 67ª, connecting the carrier with the cross head and the adjusting screw 69ª which operates the cross head.

In the operation of the machine, the material from which the insoles are to be cut is placed upon the tables 36, and the material from which the outsoles are to be cut is placed upon the tables 71. The knives for the insoles and outsoles are adjusted to a proper bearing upon the material to be acted upon, and the machine is then set in motion. The machine will need no further attention until it is to be again supplied with material, since the carriage will move backward or forward simultaneously dropping the different sets of knives, and the knives are so placed that when an outsole has been rounded out, channeled and grooved, the insole will have been completed; and as each insole and outsole is completed the carriage drops to operate upon the next, the outsoles, as completed, being discharged from the pile, while the insoles are left clamped between the pattern and the table against which they rest. When the last piece of material upon each table has been operated upon, the carriages will have dropped so low that the shifting arm 122 will engage with the lever 123 in a manner to shift the driving belt and stop the machine.

It will be understood that in the operation of the carriages, the several sets of trip arms and trip fingers connected with the carriages and with the supports heretofore described located upon the carriages, will act automatically to simultaneously shift the bars of each carriage so as to throw corresponding bars in rack engagement with the main driven shaft and the rack surfaces of the corresponding bars out of engagement with said shaft.

The mechanism of the machine is exceedingly simple in a machine of this character, and it is obvious that all parts are constructed to operate in unison, and that whenever any irregular pressure is brought to bear upon any part, tension mechanism is provided to regulate and control the same.

Having thus described my invention, I claim as new and desire to secure by Letters Patent—

1. In a rounding out and channeling machine, a revoluble table adapted to carry manifold sheets, a pattern held over the table, reciprocating knives located in the path of rotation of the table, and means for periodically decreasing the distance between the knives and table to permit the knives to successively operate on the several sheets, substantially as shown and described.

2. In a rounding out and channeling machine, a revoluble table adapted to carry manifold sheets, a pattern held above and turning with the table, a knife carriage the knives of which are held in the path of rotation of the table and pattern, and means for automatically lowering the carriage to permit the knives to successively operate on the several sheets, substantially as shown and described.

3. In a rounding out and channeling machine, a revoluble table adapted to carry manifold sheets, a pattern rotating with the table, knives located in the path of rotation of the table and pattern, a reciprocating carriage supporting the knives, a feed device for the knives connected with the carriage, and a trip mechanism located upon the carriage, whereby the direction of travel of the carriage is changed, substantially as described.

4. In a rounding out and channeling machine, a revoluble table adapted to carry manifold sheets, a pattern located over the table, knives guided by the pattern and adapted to operate upon the said sheets, a reciprocating carriage carrying the knives, and a feed device for the knives connected with the carriage, as and for the purpose set forth.

5. In a rounding out and channeling machine, a revoluble table adapted to carry manifold sheets, a pattern located over the table and turning therewith, knives guided by the pattern, a reciprocating carriage laterally operating the knives, a feed device vertically adjusting the knives, and a driving mechanism having timed driving connection with the carriage, the feed device, the table and the pattern, whereby the knives act automatically and successively upon the sheets, as and for the purpose specified.

6. In a rounding out and channeling machine, a revoluble table adapted to carry manifold sheets, a pattern turning with the table, knives guided by the pattern, a reciprocating carriage supporting the knives, a feed device vertically adjusting the knives, a driving mechanism having timed connection with the carriage, the feed device, the table and pattern, a shifter connected with the source of power, and a trip located upon the carriage, adapted to engage with the shifter, substantially as shown and described.

7. In a rounding out and channeling machine, a revoluble table carrying the sheets to be cut, a pattern held above and revolving with the table, knives guided by the pattern, a lifting device connected with the knives, and a discharge device having engagement with the uppermost sheet and operated from the lifting device, substantially as described.

8. In a rounding out and channeling machine, a revoluble table adapted to carry manifold sheets, a pattern rotating with the table, knives located in the path of rotation of the table and guided by the pattern, a reciprocating support for the knives imparting lateral movement thereto, a vertical feed connected with the support, and a discharge device operating upon the upper sheet, and means for operating said discharge device upon the completion of a sole, substantially as described.

9. In a rounding out and channeling machine, a revoluble table adapted to carry manifold sheets, a second table having independent and progressive vertical movement and a rotary movement with the sheet carrying table, and a series of guide arms carried by the second table, which arms serve to hold the sheets in compact shape and recede as the sheets are acted upon, substantially as shown and described.

10. In a rounding out and channeling machine, a revoluble table adapted to carry manifold sheets, a second table turning with the sheet table and having likewise progressive vertical movement, and a series of guard arms normally engaging with the side of the sheets, said arms having pivotal and locking engagement with the said second table, as and for the purpose specified.

11. In a rounding out and channeling machine, a revoluble table adapted to carry manifold sheets, a second table turning with the sheet table and having progressive vertical movement, and a series of guide arms normally engaging with the sides of the sheets, said arms having adjustable and pivotal engagement with the second table, and a knife carried by one of the arms, adapted to cut the border trimmed from the sole, substantially as specified.

12. In a rounding out and sole-channeling machine, the combination, with a revoluble table adapted to carry manifold sheets, a carriage, and a driving mechanism imparting reciprocating movement to the carriage, of a knife holder, the knife of which is adapted for engagement with the sheets, the said holder being supported from the carriage, and a feed device, the same consisting of racks, boxes in which the carriage has support, capable of sliding movement in the presence of the racks, feed shafts extending through the boxes, and spiral blades held to revolve in the boxes and engage with the racks, the blades being made in two planes and provided with an abrupt run from the lower to the upper plane, as and for the purpose set forth.

13. In a sole-channeling and rounding out machine, the combination, with revoluble tables adapted to carry the sheets to be acted upon, and a carriage located above the table, consisting of two parallel bars, sliding boxes in which the bars are mounted, each bar being provided with a rack surface upon different faces, and pattern shafts provided with trip arms, of a driving shaft, guards carried by the driving shaft and adapted for engagement with the rack surfaces of the carriage rods, shifting devices located upon the rods, whereby the rods will be turned upon engagement with the trip arms of the pattern shafts and the direction of travel of the carriage reversed, and a feed device connected with the carriage, substantially as shown and described.

14. In a rounding out and channeling machine, the combination with rotary tables adapted to carry the sheets to be operated upon, and patterns having rotary movement with the tables, and a carriage having reciprocating movement above the patterns, of knife carriers suspended from the carriage, feed devices connected with the carriage, and tension devices connected with the knife holders or carriers, whereby the knives are kept constantly in working position while the machine is in operation, substantially as shown and described.

15. In a rounding out and channeling machine, the combination with a pattern, of a knife holder, a roller mounted in the holder above the knife, and means for adjusting the roller forward or rearward of the knife, substantially as and for the purpose set forth.

16. In a rounding out and channeling machine, the combination, with a pattern having a raised cam surface at its heel section, of a tool holder provided with a fixed rounding out knife at its lower end and adjustable channeling and grooving knives located in advance of the rounding out knife, and a lifting arm connected with the support of the channeling and grooving knives, said knives being provided with a roller traveling upon the pattern, which roller when it reaches the cam surface of the pattern elevates the channeling and grooving knives from engagement with the material being operated upon, without affecting the position of the rounding out knife, substantially as shown and described.

17. In a rounding out and channeling machine, the combination, with a pattern, of a knife holder provided with an adjustable roller engaging with the pattern and regulating the size of the article to be cut, a rounding out knife securely fastened to the holder below the guide roller, pivoted, spring-controlled arms located upon the lower portions of the holder, channeling and grooving knives carried by the said arms, and a lifting mechanism connected with the arms and operated by the pattern, substantially as and for the purpose specified.

18. In a rounding out and channeling machine, the combination, with a pattern, presser feet carried by the pattern, a lift mechanism carried by the pattern, and a discharge shaft loosely mounted in one of the presser feet and adapted for engagement with the sole being acted upon, the shaft being spring-controlled and provided with an upper head, of a knife-holder, a rounding-out knife fixed to the holder, and cushioned channeling and grooving knives pivotally connected with the holder, a lift arm connected with the support for the channeling and grooving knives and operated by the pattern, and a trip carried by the operating arm and adapted for time engagement with the head of the discharge shaft, as and for the purpose specified.

19. In a rounding out and channeling machine, the combination of a revoluble table adapted to carry manifold sheets, a pattern above the table, a knife holder adjacent to the table and having progressive downward movement to permit the several sheets to be successively operated upon, and means for automatically stopping the machine when the last sheet has been operated upon, substantially as described.

20. In a rounding out and channeling machine, the combination of a revoluble table adapted to carry manifold sheets, a pattern above the table, knives adjacent to the table and having progressive downward movement to permit the knives to operate successively on the several sheets, a discharge device for discharging the sheets after they have been operated upon, and means for stopping the machine when the last sheet has been operated upon, substantially as described.

21. In a rounding out and channeling machine, a rounding out knife provided with a diamond point having cutting edges upon both sides and with ribs upon one of its faces, substantially as and for the purpose set forth.

22. In a sole rounding-out and channeling machine, a rounding out knife provided with a diamond point and inclined cutting surfaces at each side of the point, the body of the knife being provided with a concaved face and projections upon its opposite face, as and for the purpose specified.

23. In a sole rounding-out and channeling machine, a combined grooving and channeling knife, the same comprising a shank, a cutting section adapted for grooving located at an angle to the shank, and a cutting channeling section of substantially loop formation emanating from the grooving section, as and for the purpose specified.

GEORGE F. FISCHER.

Witnesses:
ELISABETH FISCHER,
A. A. DAVIS.